May 29, 1923.

L. L. GALLUP

EDUCATIONAL DEVICE

Filed April 28, 1921

1,457,223

INVENTOR.

LUKE L. GALLUP

BY

ATTORNEYS.

Patented May 29, 1923.

1,457,223

UNITED STATES PATENT OFFICE.

LUKE L. GALLUP, OF LOS ANGELES, CALIFORNIA.

EDUCATIONAL DEVICE.

Application filed April 28, 1921. Serial No. 465,260.

*To all whom it may concern:*

Be it known that I, LUKE L. GALLUP, a citizen of the United States, residing at Los Angeles, in the county of Los Angeles and State of California, have invented new and useful Improvements in Educational Devices, of which the following is a specification.

This invention is an educational appliance by means of which children may be taught to read numbers and to spell simple words.

More specifically, the invention includes a suitable base having display openings and shiftable members beneath the same which carry suitable display elements, such as numerals or letters, the said display elements being adapted to be shown through the openings in the base to form various combinations of letters or figures. The apparatus also includes suitable shutter mechanism arranged in conjunction with the display openings in order that a part, or the whole, of a combination of figures or letters showing through the display openings may be concealed.

While I have stated the invention as particularly adaptable for teaching the reading of numbers, or the spelling of words, it will be apparent that any suitable display elements may be shown upon the shiftable members of the apparatus, and that the various combinations of such elements may be employed for teaching various subjects.

The main object of the device is to quickly display numbers in the teaching of addition, subtraction, multiplication and division, the pupil being supposed to supply the answer to the numbers displayed.

The invention will be readily understood from the following description of the accompanying drawings, in which.

Figure 1:
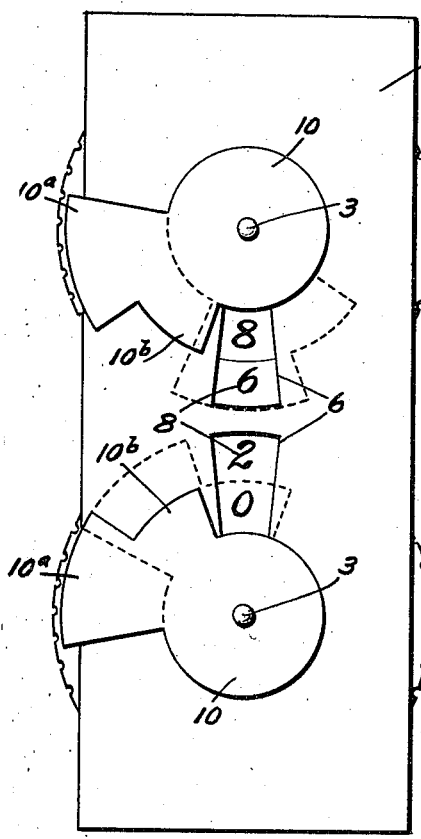
Figure 1 is a front elevation of a device constructed in accordance with the invention.
Figure 2:
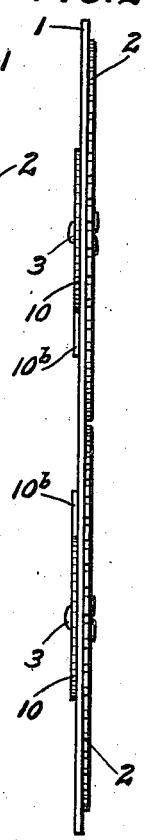
Fig. 2 is an edge view of the same.
Figure 3:
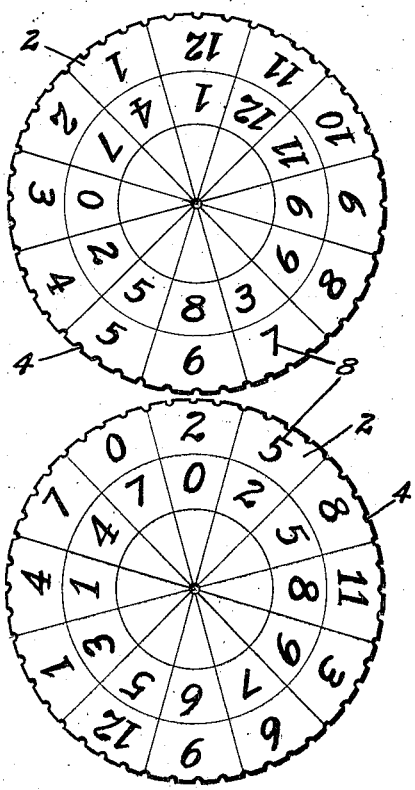
Fig. 3 is an elevation of the shiftable members employed in the apparatus.

In the form of the invention illustrated in Fig. 1, a base 1 is provided which may be of cardboard, or the like, and the shiftable members forming a part of the apparatus are shown as discs 2 rotatably mounted upon the back of base 1 as by pivot pins 3. The discs are arranged with their peripheries adjacent one another, and said peripheries are preferably notched as shown at 4, so that the portions of said peripheries extending beyond the sides of base 1 may be readily engaged by the fingers for rotating the discs.

Slots 6 are arranged in base 1 so as to overlie segments of the respective discs. These slots are positioned adjacent one another, so that a combination of the display elements upon the respective discs will be shown through the adjacent slots.

The discs carry display elements shown as numerals 8 and preferably arranged in a plurality of radially spaced series around the discs, so that the rotation of a disc to any desired position will display a number formed by a combination of numerals 8 in the respective radial series. It will be understood that rotation of the discs relative to one another, will cause a number to be displayed, which is a combination of numerals shown by the respective discs, and that the number thus formed may be changed by varying the relative position of the discs.

Means are provided for concealing the numerals displayed through either slot 6, and for also partially masking either one of the slots in order that only certain ones of the radially spaced series of numerals will be shown through the slot. By this arrangement a number may be formed having a greater or less number of digits.

The shutter mechanism employed for this purpose includes segmental members 10 mounted upon base 1 and pivoted upon pins 3, so that the shoulders may be swung to mask the respective slots 6. The shoulders each include a radially extending portion 10ª which will completely mask slots 6, and are also formed with a circumferentially offset portion 10ᵇ which is only of sufficient radial length to overlie a part of slot 6 and as a consequence conceal the numerals of one of the radial series while displaying the numerals of the other radial series.

It will be understood that an apparatus as thus described may be employed as an educational means for teaching the reading of numbers to children, and by the proper arrangement of the numerals upon the discs may also be adapted for displaying, by means of one disc, the sum or difference of the numerals displayed by the radially spaced series of the other disc, or the product or quotient of the numbers displayed.

Figure 4:
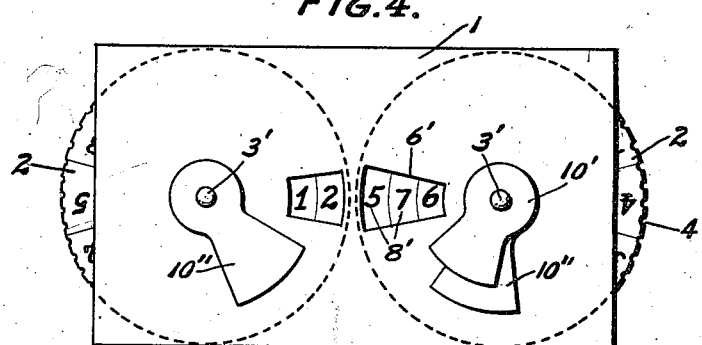
Fig. 4 is a front elevation of a modified form of the invention.

In the form of the invention illustrated in Fig. 4, the shutter mechanism is shown as including a plurality of shutters 10' and 10" pivoted upon a pin 3' and of different radial lengths, so that one of said shutters will conceal a certain portion of slots 6', while the other shutter will conceal a greater radial length of said slot in order that the numerals 8' of one or more of the radial series may be displayed.

Figure 5:
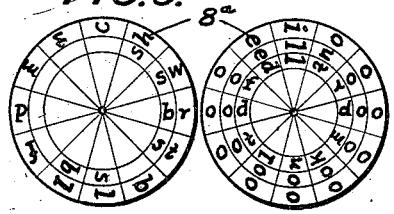
Fig. 5 is an elevation of the shiftable members of the apparatus and showing a different set of display elements thereon.

In the form of the invention illustrated in Fig. 5, I have shown the display disc of the apparatus as provided with radially spaced series of letters 8ª which are so arranged that by rotating the discs into the proper relative position the combination of the letters displayed will spell simple words. By such an arrangement the educational appliance may be employed for teaching spelling.

It will be noted that the construction as thus set forth provides an extremely simple but practical appliance for the use in schools and the like, in order to form a practical aid in teaching the reading of numbers and of simple words and the like.

Various changes may be made without departing from the spirit of the invention as claimed.

What is claimed is:

1. An educational device comprising a base having alined display openings formed therein, disks rotatably mounted on separate axes and disposed upon the same face of said base, symbols on each disk arranged in radial series adapted to be successively displayed through one of said openings on rotation of said disk, the exposed symbols of one disk cooperating with the exposed symbols of the other disk, and shutters for the respective disks mounted for rotation about the axes of said disks, said shutters being each provided with a radially extending portion to enable the covering of part or all of the respective opening for the purpose described.

2. An educational device comprising a base having alined display openings formed therein, members rotatably mounted on separate axes and disposed upon the same face of the base, numerals on each member arranged to be successively displayed through one of said openings on rotation of said member, the exposed numerals of one member cooperating with the exposed numerals of the other member, and means for the respective members for covering a part or all of the respective openings for the purpose described.

In testimony whereof I have signed my name to this specification.

LUKE L. GALLUP.